(12) United States Patent
Yoo et al.

(10) Patent No.: US 8,478,058 B2
(45) Date of Patent: Jul. 2, 2013

(54) APPARATUS AND METHOD FOR REDUCING NOISE FROM AN IMAGE

(75) Inventors: Young-Jin Yoo, Hwaseong-si (KR); Ho-cheon Wey, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 604 days.

(21) Appl. No.: 12/720,339

(22) Filed: Mar. 9, 2010

(65) Prior Publication Data
US 2010/0226590 A1 Sep. 9, 2010

(30) Foreign Application Priority Data
Mar. 9, 2009 (KR) .................. 10-2009-0019965

(51) Int. Cl.
*G06K 9/46* (2006.01)
(52) U.S. Cl.
USPC ............................ 382/232; 382/250; 382/302
(58) Field of Classification Search
USPC ........................................ 382/232, 250, 302
See application file for complete search history.

(56) References Cited

U.S. PATENT DOCUMENTS

| | | | | |
|---|---|---|---|---|
| 5,619,998 A * | 4/1997 | Abdel-Malek et al. | ....... | 600/437 |
| 5,790,694 A * | 8/1998 | Maruo | ........................... | 382/149 |
| 5,802,481 A * | 9/1998 | Prieto | .......................... | 702/190 |
| 6,195,456 B1 * | 2/2001 | Balasubramanian et al. | | 382/167 |
| 6,801,672 B1 * | 10/2004 | Thomas | ........................ | 382/275 |
| 6,823,090 B2 * | 11/2004 | Matsuura | ..................... | 382/275 |
| 6,879,729 B2 | 4/2005 | Kamath et al. | | |
| 6,975,753 B2 * | 12/2005 | Matsuura et al. | ............. | 382/132 |
| 7,068,851 B1 | 6/2006 | Berkner | | |
| 7,206,455 B1 | 4/2007 | Hatipoglu | | |
| 7,245,776 B2 | 7/2007 | Matsuura | | |
| 7,260,272 B2 * | 8/2007 | Lin et al. | ........................ | 382/275 |
| 7,403,665 B2 | 7/2008 | Zhang | | |
| 8,374,457 B1 * | 2/2013 | Wang et al. | .................... | 382/266 |
| 2002/0034337 A1 * | 3/2002 | Shekter | ......................... | 382/275 |
| 2002/0191700 A1 * | 12/2002 | Varshney et al. | ......... | 375/240.19 |
| 2005/0259889 A1 * | 11/2005 | Ferrari et al. | .................. | 382/275 |
| 2008/0166064 A1 | 7/2008 | Fu | | |
| 2008/0199100 A1 | 8/2008 | Ishiga | | |

FOREIGN PATENT DOCUMENTS

| | | |
|---|---|---|
| JP | 2002-216126 | 8/2002 |
| JP | 2007-272536 | 10/2007 |
| KR | 10-2005-0122164 | 12/2005 |

OTHER PUBLICATIONS

Image noise removal—optimization, Guo et al., IEEE, 0-7695-2875-9, 2007, pp. 1-5.*
A novel approach—Domain, Zhou et al., IEEE, 0-7803-9584-0, 2006, pp. 463-466.*
M. Kivanc Mihcak et al, "Low-Complexity Image Denoising Based on Statistical Modeling of Wavelet Coefficients," *IEEE Signal Processing Letters*, Dec. 1999, pp. 300-303, vol. 6 No. 12, IEEE Signal Processing Society, Piscataway, NJ, USA.

* cited by examiner

*Primary Examiner* — Jayesh A Patel
(74) *Attorney, Agent, or Firm* — NSIP Law

(57) ABSTRACT

An apparatus and method for reducing noise in a high definition image are provided. When performing wavelet shrinkage for reducing noise, a signal level of an image may be estimated by adjusting a kernel size, and a noise level of the image may be estimated using a noise level function. After the signal level and the noise level are estimated, the noise may be removed or reduced, based on the signal level and the noise level, and the detail of the image may be maintained.

18 Claims, 10 Drawing Sheets

FIG.5

| KERNEL SET | RESOLUTION LEVEL | BINARY DATA | KERNEL SIZE |
|---|---|---|---|
| #1 | 1 | 0 | 9×9 |
|  |  | 1 | 7×7 |
| #2 | 2 | 0 | 7×7 |
|  |  | 1 | 5×5 |
| #3 | 3 | 0 | 5×5 |
|  |  | 1 | 3×3 |
| ⋮ | ⋮ | ⋮ | ⋮ |

APPARATUS AND METHOD FOR REDUCING NOISE FROM AN IMAGE

CROSS-REFERENCE TO RELATED APPLICATION

This application claims the benefit under 35 U.S.C. §119 (a) of a Korean Patent Application No. 10-2009-0019965, filed on Mar. 9, 2009, in the Korean Intellectual Property Office, the entire disclosure of which is incorporated herein by reference for all purposes.

BACKGROUND

1. Field

The following description relates to a technology for noise reduction, and more particularly, to a technology capable of removing or reducing noise from a high definition image.

2. Description of the Related Art

Recently, image sensors for digital cameras and camera phones have been developed to have increasingly miniaturized configurations and to allow for the taking of high definition images. Such miniaturization and high definition capability has a side effect of causing a high-level of noise which deteriorates the quality of the image.

For high definition photographing it is desirable to obtain a shutter speed appropriate for vibration correction in low luminance conditions. However such technologies in combination with a high definition photographing capability may dramatically increase the level of noise present in a captured image.

In this regards, to improve digital cameras and camera phones, an International Organization for Standardization (ISO) noise removing or reducing method should be developed for high definition photographing.

SUMMARY

In one general aspect, provided is an apparatus for reducing noise in an image, the apparatus comprising a transformation unit to divide the image into a plurality of sub-bands through wavelet transformation, a signal level estimation unit to estimate the signal level of the image using a kernel of which a size varies according to at least one of a resolution level and binary data of each sub-band, a noise level estimation unit to estimate a noise level of the image using a predetermined noise profile, and a noise reducing unit to reduce noise in the image using the estimated signal level and the estimated noise level.

The signal level estimation unit may comprise a kernel set storage unit to store a kernel set in which the size of the kernel is based on the resolution level and the binary data of each of the sub-bands, a kernel map generation unit to generate a kernel map by converting wavelet coefficients of the sub-band into binary data, and a signal level calculation unit to calculate the signal level while adjusting the size of the kernel based on the kernel map and the kernel set.

The resolution levels may range from a first resolution level representing a highest resolution to a $n^{th}$ resolution level representing a lowest resolution, and the kernel map generation unit may select at least one sub-band having one of the $n^{th}$ resolution level, an $n-1^{th}$ resolution level, or an $n-2^{th}$ resolution level, and generates the kernel map corresponding to the selected sub-band.

The kernel map may be generated by normalizing the wavelet coefficients of the selected sub-band, converting the normalized wavelet coefficients into binary data, and performing morphological dilatation on the converted binary data.

The noise level estimation unit may comprise a profile storage unit to store the noise profile that includes a plurality of functions which represent noise corresponding to luminance, a patch extraction unit to divide the image into a plurality of patches and extract a reference patch from the plurality of patches, and a noise level calculation unit to select a function by comparing a noise statistic of the extracted reference patch with the noise profile.

The patch extraction unit may extract patches corresponding to a predetermined luminance level area based on the noise profile and determine, as the reference patch, a patch from among the extracted patches using standard deviations of the extracted patches.

The predetermined luminance level area may correspond to an area of the function that exhibits a largest noise variation.

The noise reducing unit may reduce the noise through wavelet shrinkage based on the estimated signal level and the estimated noise level.

The apparatus may further comprise an inverse transformation unit to receive a processing result by the noise reducing unit and recover the image through inverse wavelet transformation.

In another aspect, provided is a method of reducing noise in an image, the method comprising dividing the image into a plurality of sub-bands through wavelet transformation, estimating a signal level of the image using a kernel of which a size varies according to at least one of a resolution level or binary data of each sub-band, estimating a noise level of the image using a noise profile, and reducing noise in the image using the estimated signal level and the estimated noise level.

The estimating of the signal level may comprise storing a kernel set in which the size of the kernel is defined according to the resolution level and binary data of each sub-band, generating a kernel map by converting wavelet coefficients of each sub-band into binary data, and calculating the signal level while adjusting the size of the kernel based on the kernel map and the kernel set.

The resolution levels may range from a first resolution level representing a highest resolution to an $n^{th}$ resolution level representing a lowest resolution, and the generating of the kernel map may comprise selecting at least one sub-band having one of the $n^{th}$ resolution level, an $n-1^{th}$ resolution level, or an $n-2^{th}$ resolution level, and generating the kernel map corresponding to the selected sub-band.

The kernel map may be generated by normalizing the wavelet coefficients of the sub-band, converting the normalized wavelet coefficients into binary data, and performing morphological dilatation on the binary data.

The estimating of the noise level may comprise dividing the image into a plurality of patches and extracting a reference patch from the plurality of patches, and selecting a function which represents noise corresponding to luminance by comparing a noise statistic of the extracted reference patch with the noise profile.

The extracting of the reference patch may comprise extracting patches corresponding to a predetermined luminance level area based on the noise profile and extracting, as the reference patch, a patch from among the extracted patches using standard deviations of the extracted patches.

The predetermined luminance level area may correspond to an area of the function that exhibits a largest noise variation.

The reducing of the noise may be performed through wavelet shrinkage based on the estimated signal level and the estimated noise level.

The method may further comprise recovering the image through inverse wavelet transformation.

Other features and aspects will be apparent from the following detailed description, the drawings, and the claims.

BRIEF DESCRIPTION OF THE DRAWINGS

FIG. 5 is a table illustrating an example of a kernel set.

Figure 1:
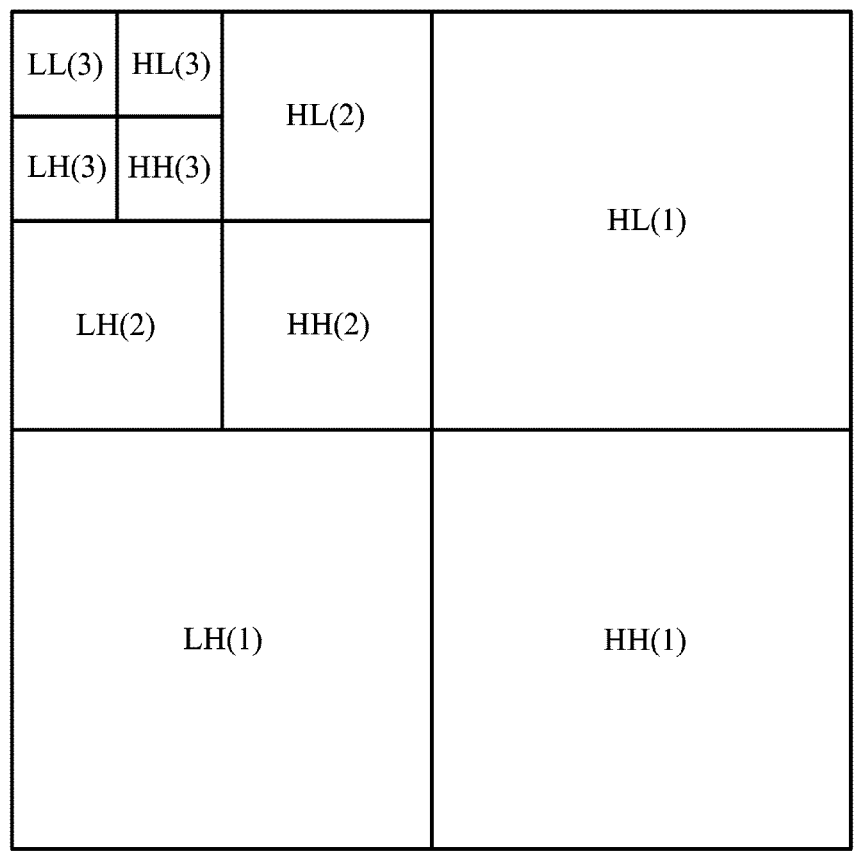
FIG. 1 is a diagram illustrating an example of a wavelet transformation image.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Various changes, modifications, and equivalents of the methods, apparatuses, and/or systems described herein will be suggested to those of ordinary skill in the art. Descriptions of well-known functions and structures may be omitted for increased clarity and conciseness.

FIG. 1 illustrates an example of a wavelet transformation image.

Wavelet transformation includes decomposing a given signal into a plurality of different frequency bands using at least two filters. For example, for a two-dimensional wavelet transformation, such a decomposing operation may be performed on the image in a horizontal direction and a vertical direction of the image. The decomposing of the frequency band may be achieved by passing an image signal through a filter, such as a high band filter, a low band filter, and the like.

In the example shown in FIG. 1, the image is divided into sub-bands corresponding to HH, HL, LH and LL through wavelet transformation. In this example, 'H' represents a high frequency component and 'L' represents a low frequency component. The HH sub-band may be obtained by passing a horizontal component and a vertical component of the image through a high frequency filter. The HL sub-band and the LH sub-band may be obtained by passing either the horizontal or the vertical component through a high frequency filter, and passing the other component through a low frequency filter. The LL sub-band may be obtained by passing the horizontal component and the vertical component through a low frequency filter. In some embodiments, the LL may include approximate information, and the HH, HL, and LH may include detailed information.

The decomposing operation may be repeatedly performed. In FIG. 1, the number shown in the brackets refers to a decomposition level or a resolution level. In the example shown in FIG. 1, the resolution level is divided into three levels. Level 1 is a higher resolution and Level 3 is a lower resolution. For example, HL(2) represents a sub-band obtained by performing wavelet transformation on the LL(1) sub-band that has been subject to a decomposition through wavelet transformation. The HL(2) sub-band may be obtained by processing a horizontal component and a vertical component of the image through a high frequency filter and a low frequency filter, respectively. Mathematically, a sub-band includes wavelet coefficients that correspond to pixels.

Figure 2:
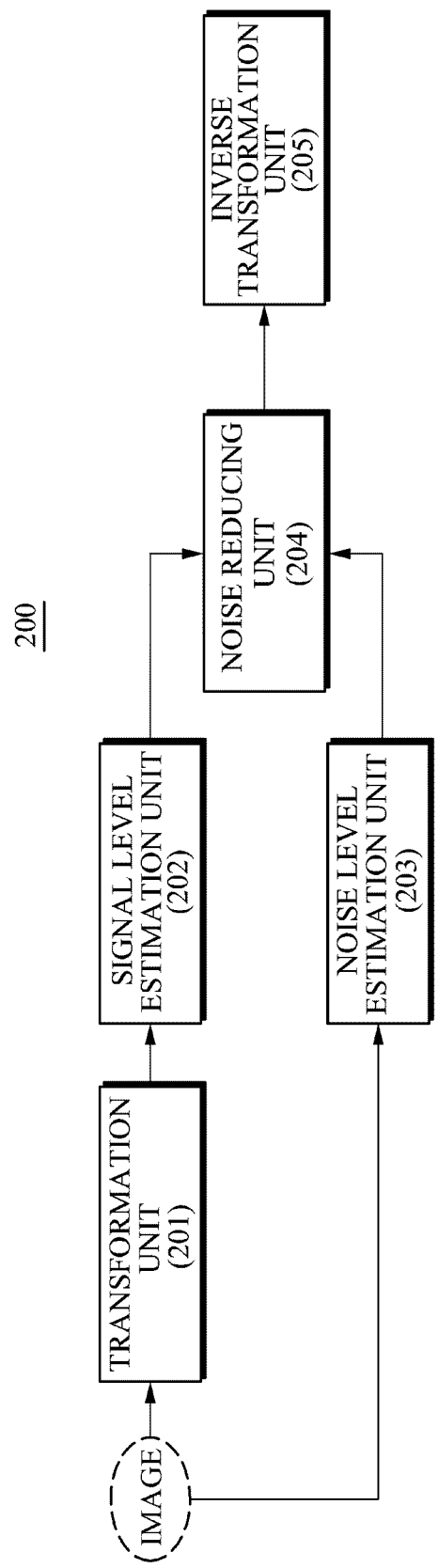
FIG. 2 is a diagram illustrating an example of a noise removal or reducing apparatus.

FIG. 2 illustrates an example of a noise removal or reducing apparatus.

Referring to FIG. 2, the example noise removing or reducing apparatus 200 includes a transformation unit 201, a signal level estimation unit 202, a noise level estimation unit 203, a noise reducing unit 204, and an inverse transformation unit 205.

The transformation unit 201 divides an image through wavelet transformation. The transformation unit 201 divides the image into sub-bands having one or more resolution levels, for example, one level, two levels, three levels, four levels, or more. The transformation unit 201 may perform wavelet transformation on a received image to generate a wavelet transformation image as shown in FIG. 1.

The signal level estimation unit 202 estimates a signal level of the image. The signal level estimation unit 202 selects a resolution level of the wavelet transformation image. In some embodiments, the signal estimation unit 202 selects a predetermined resolution level. The signal level estimation unit 202 may select a low resolution level. For example, a resolution of Level 2 corresponding to a low resolution level may be selected from the wavelet transformation image in FIG. 1.

The signal level estimation unit 202 estimates the signal level of the sub-bands having the selected resolution level. For example, if a resolution of Level 2 is selected, the calculation of the signal level is performed on the LH(2), HH(2) and HL(2) sub-bands.

The signal level estimation unit 202 may estimate the signal level of the image while applying a kernel size suitable for the respective sub-bands. The kernel size represents a processing unit used for calculating a signal level. The signal level may be obtained, for example, by defining a window having a center corresponding to a predetermined pixel and then calculating a square mean for the wavelet coefficients of pixels in the window. The kernel size corresponds to the window that may be used to calculate the signal level. For example, the kernel size may be expressed as a multiplication of the number of pixels such as 2×2, 3×3, 4×4, or 5×5.

The noise level estimation unit 203 estimates a noise level of an image. The noise level estimation unit 203 estimates a noise level of an image using a noise profile. The noise profile may be a set of noise level functions having a luminance level as an independent variable. The noise profile may be defined by a user. For example, the noise level estimation unit 203 may select a noise level function representing noise characteristics of the image from the noise profile.

The processing result of the signal level estimation unit 202 may include a signal level of each pixel of the image. The processing result of the noise level estimation unit 203 may include a noise level of each pixel of the image.

The noise reducing unit 204 may perform wavelet shrinkage to reduce noise in the image. The noise reducing unit 204 may use the results of the signal level estimation unit 202 and/or the noise level estimation unit 203. For example, the noise reducing unit 204 may calculate a noise processing coefficient based on the signal level and the noise level at each pixel of the image, and multiply the noise processing coefficient by the wavelet coefficient of the corresponding pixel. Thus, noise may be reduced.

The inverse transformation unit 205 performs an inverse transformation operation, which is the inverse of the transformation operation performed by the transformation unit 201. For example, the inverse transformation unit 205 may perform inverse wavelet transformation on an image output from the noise reducing unit 204, thereby recovering the original image.

The noise removal or reducing apparatus may be included in a terminal, for example, a mobile phone, a computer, a camera, an MP3 player, and the like.

Figure 3:
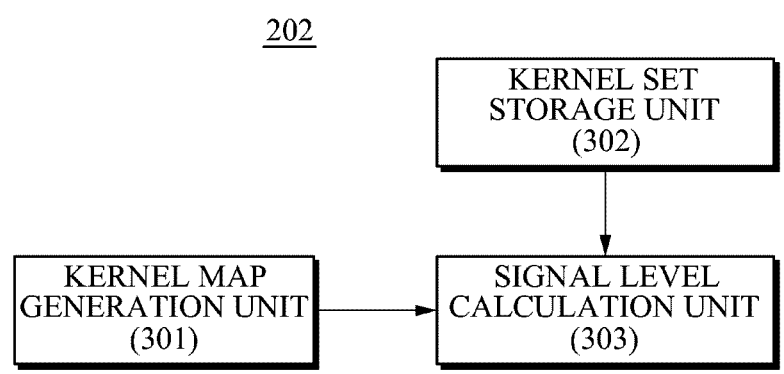
FIG. 3 is a diagram illustrating an example of a signal level estimation unit.

FIG. 3 illustrates an example of signal level estimation unit. Referring to FIG. 3, the example signal level estimation unit 202 includes a kernel map generation unit 301, a kernel set storage unit 302, and a signal level calculation unit 303.

The kernel map generation unit 301 generates a kernel map. The kernel map is a feature represented as binary data converted from wavelet coefficients of the sub-bands. In some embodiments, the kernel map may be formed based on sub-bands having a predetermined resolution level. The kernel map generation unit 301 normalizes the wavelet coefficients of the selected sub-bands. For example, the wavelet coefficients may be converged into a range from 0 to 1.

The kernel map generation unit 301, for example, may convert the normalized coefficients such that the normalized coefficients are converted into a value of 0 or 1. For example, a wavelet coefficient exceeding a critical value of 0.5 may be converted into 1, and a wavelet coefficient below 0.5 may be converted into 0. The wavelet coefficient value of 0.5 may be converted to 0 or 1.

Figure 4:
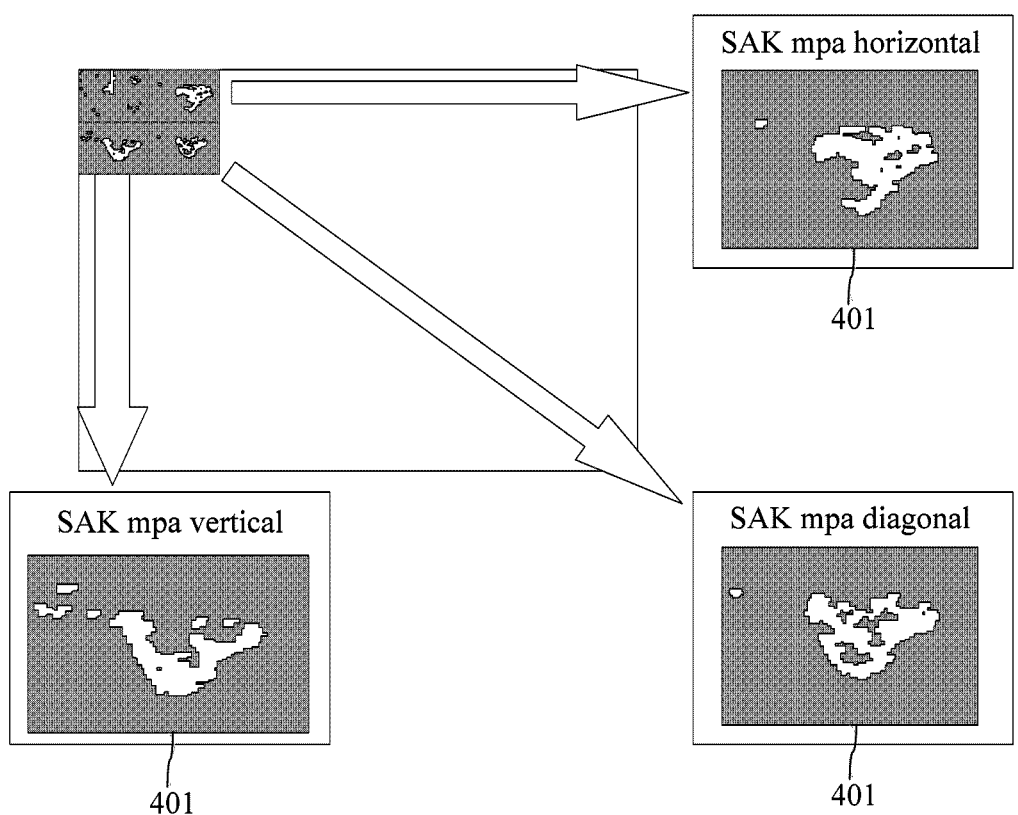
FIG. 4 is a diagram illustrating an example of a kernel map.

The kernel map generation unit 301 forms a kernel map. An example kernel map is shown in FIG. 4. In some embodiments, the kernel map is formed through a morphological dilatation.

Referring to FIG. 4, the kernel map 401 may be generated based on sub-bands having a predetermined resolution. In this example, a sub-band containing approximate information (LL) is not used when generating the kernel map 401. In FIG. 4, a white pixel is represented as binary data 1, and a black pixel is represented as binary data 0. For example, if the resolution levels range from a first resolution level representing a high resolution to an $n^{th}$ resolution level representing a low resolution, the kernel map may be generated based on a sub-band having one of the $n^{th}$ resolution level, an $n-1^{th}$ resolution level, an $n-2^{th}$ resolution level, and the like.

Referring again to FIG. 3, the kernel set storage unit 302 stores a kernel set. The kernel set is a table in which a kernel size is represented according to binary data.

FIG. 5 illustrates an example of a kernel set. Referring to FIG. 5, the kernel size may be defined according to the resolution level and the binary data. Such a kernel set may be determined by a user in consideration of a resolution level of an image sensor or characteristics of a camera.

Referring again to FIG. 3, the signal level calculation unit 303 calculates the signal level at each pixel using the kernel map (see FIG. 4) and the kernel set (see FIG. 5). The signal level calculation unit 303 may calculate the signal level of a corresponding pixel while moving from pixel to pixel. For example, the signal level calculation unit 303 may set a window having a center corresponding to a preset pixel. The signal level calculation unit 303 may perform the wavelet coefficients on pixels in the window, thereby calculating a signal level. The signal level calculation unit 303 may move to a nearby pixel and repeats the process that was performed on the previous pixel. The size of the window corresponds to the kernel size.

The signal level calculation unit 303 calculates a signal level based on the kernel map. The kernel map is formed using binary data. Accordingly, when calculating a signal level of a pixel, if the pixel is determined, a kernel size corresponding to the pixel may be automatically determined. For example, as shown in FIG. 5, if the kernel map is generated based on sub-bands having a resolution level of Level 3, a kernel set of #3 is selected. Based on kernel set #3, a kernel size of 5×5 is applied to an area corresponding to binary data of 0, and a kernel size of 3×3 is applied to an area corresponding to binary data of 1.

As described above, the signal level calculation unit 303 may adaptively calculate the signal level using the kernel map and the kernel set.

Figure 6:
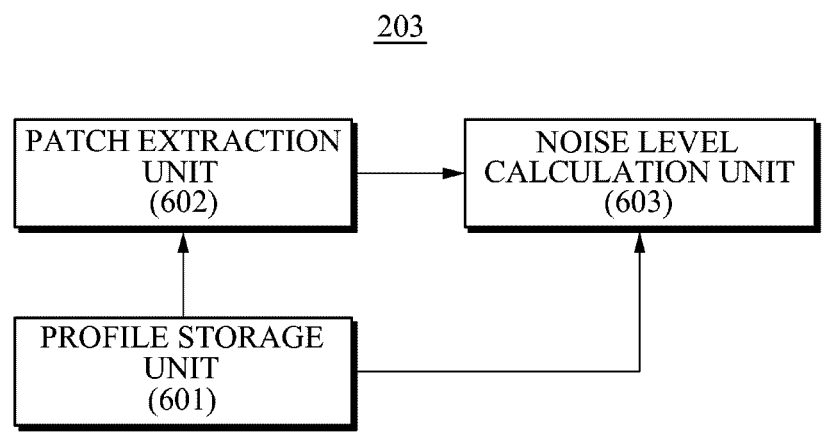
FIG. 6 is a diagram illustrating an example of a noise level estimation unit.

FIG. 6 illustrates an example of a noise level estimation unit. Referring to FIG. 6, the example noise level estimation unit 203 includes a profile storage unit 601, a patch extraction unit 602, and a noise level calculation unit 603.

Figure 7:
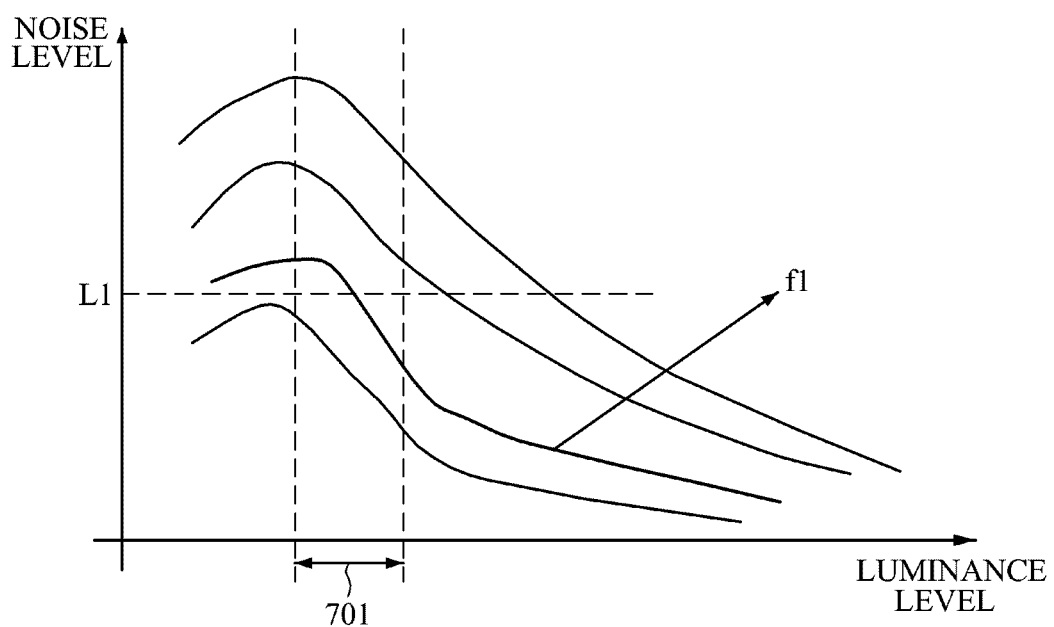
FIG. 7 is a graph illustrating an example of a noise profile.

The profile storage unit 601 stores a noise profile. The noise profile includes a plurality of noise level functions which represent noise level according to luminance level. FIG. 7 illustrates an example of a noise profile.

Referring to FIG. 7, a graph of noise level versus luminance level is shown. The X-axis represents a luminance level and the Y-axis represents a noise level. For example, the X-axis represents a brightness distribution of an image, and the Y-axis represents a noise statistic.

As shown in FIG. 7, a noise level function is selected from the noise profile. The noise level function may represent a noise distribution of a predetermine image. Because a predetermined pixel of the image has a predetermined luminance level, the noise level corresponding to the known luminance level may be obtained using the selected noise level function. For example, when a noise level function representing a noise distribution of an input image is selected, a noise level of the image may be calculated.

Referring again to FIG. 6, the patch extraction unit 602 divides an image into a plurality of patches, and extracts a reference patch from the patches. The extracted reference patch is a patch that corresponds to a luminance level area of the noise level function exhibiting the largest variation or that has the smallest standard deviation. For example, as shown in FIG. 7, if a noise level is most dramatically changed at a luminance level of 701, patches corresponding to the luminance level of 701 may be extracted, and a patch may be selected as a reference patch. For example, the patch having the smallest standard deviation may be selected from the patches as a reference patch.

Referring again to FIG. 6, the noise level calculation unit 603 selects one of the noise level functions by comparing a noise statistic of the reference patch with the noise profile. For example, as shown in FIG. 7, if the noise statistic of the reference patch extracted by the patch extraction unit 602 is L1, a noise level function (f1) is selected.

As described above, the signal level estimation unit 202 may adaptively estimate a signal level at each pixel of an image using the kernel map and the kernel set. The noise level estimation unit 203 may derive a noise level function representing noise characteristics of an image. Accordingly, if a pixel is determined, a luminance level and a signal level of the determined pixel may be obtained and thus a noise level corresponding to the luminance level may be obtained. Therefore, wavelet shrinkage for reducing noise may be performed using the signal level and the noise level.

Figure 8:
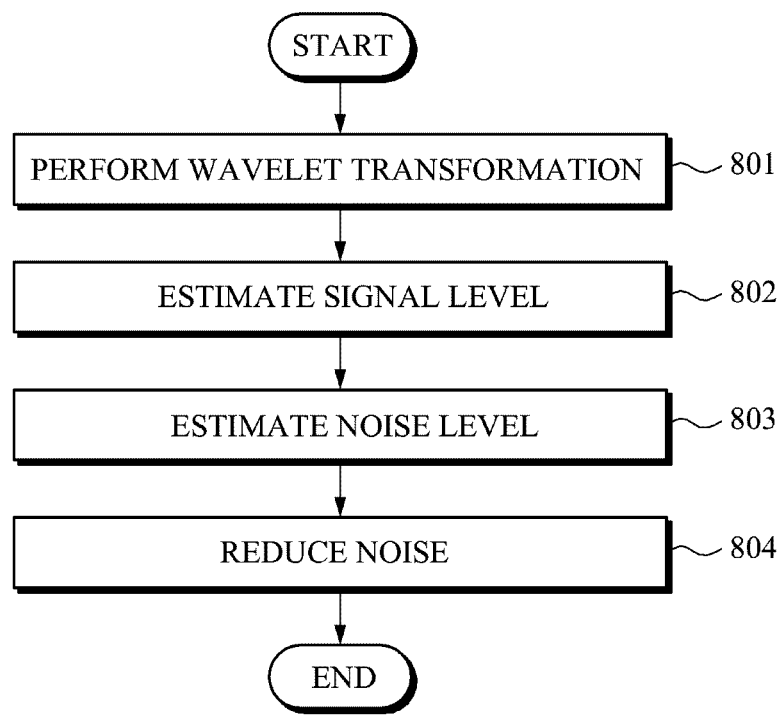
FIG. 8 is a flowchart illustrating an example of a noise removal or reducing method.

FIG. 8 is a flowchart that illustrates an example of a noise removal or reducing method. Referring to FIG. 8, in 801, an image is subjected to wavelet transformation. As a result, the image is divided into sub-bands having a plurality of resolution levels. For example, the transformation unit 201 may perform wavelet transformation on a received image to generate a wavelet transformation image shown in FIG. 1.

In 802, a signal level of the image is estimated. For example, the signal level estimation unit 202 may select a predetermined resolution level and calculate a signal level of the image by applying a kernel size corresponding to the sub-band having the selected resolution level. For example, the resolution levels may range from a first resolution level representing a high resolution to a $n^{th}$ resolution level representing a low resolution. The signal level estimation unit selects a resolution level, for example, an $n^{th}$ resolution level, an $n-1^{th}$ resolution level, an $n-2^{th}$ resolution level, and the like.

In 803, a noise level of the image is estimated. For example, the noise level estimation unit 203 may calculate a noise level of an image using a noise profile. The noise profile includes a plurality of noise level functions having a luminance level as an independent variable.

In 804, noise reduction is performed based on the signal level and the noise level. For example, the noise reduction may be performed through wavelet shrinkage in which the noise reducing unit 204 multiplies a noise processing coefficient obtained based on the signal level and the noise level by a wavelet coefficient of the corresponding pixel. In addition, transformation inverse to the transformation in 801 is performed on the processing result by the wavelet shrinkage, to recover the image.

Figure 9:
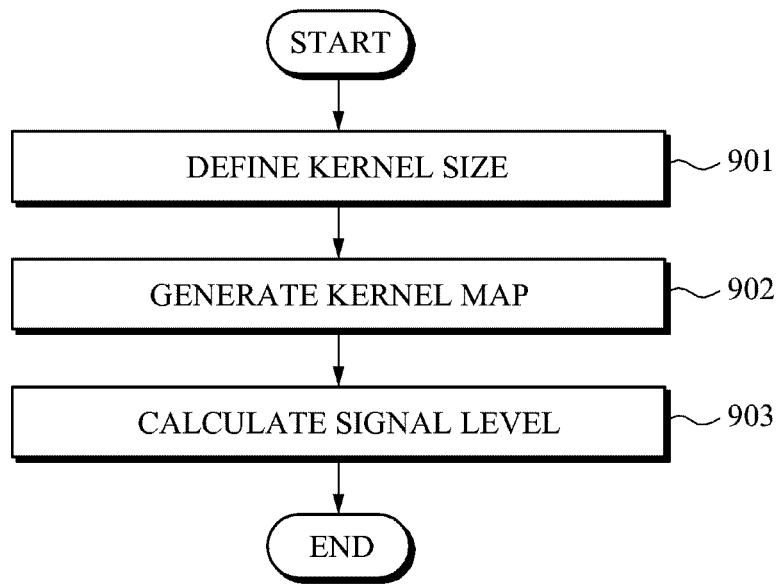
FIG. 9 is a flowchart illustrating an example of a method for estimating a signal level.

FIG. 9 is a flowchart that illustrates a method for calculating a signal level. As shown in FIG. 9, a process of estimating a signal level may be performed as follows. In 901, the kernel size is defined according to the resolution level and binary data of the sub-bands. The kernel size is expressed in the form of a table and serves as a processing unit for estimating a signal level.

In 902, a kernel map is generated by converting wavelet coefficients of a sub-band having a selected resolution level into binary data. A high resolution level, a low resolution, or a resolution level in between may be selected, for example, an $n^{th}$ resolution level, an $n-1^{th}$ resolution level, an $n-2^{th}$ resolution level, and the like. The wavelet coefficients of the sub-bands having the selected resolution level are normalized, the normalized coefficients are converted into binary data 0 or 1, and then morphological dilatation is performed on the binary data. As a result, the kernel map is generated.

In 903, the signal level is calculated in consideration of binary data and the kernel size at each pixel of the kernel map. For example, a predetermined pixel of the kernel map may be selected. After that, the signal level is calculated by applying a kernel size which is determined on whether the binary data corresponding to the pixel is 0 or 1. Such a signal level is calculated while moving the signal level calculation unit from pixel to pixel.

Figure 10:
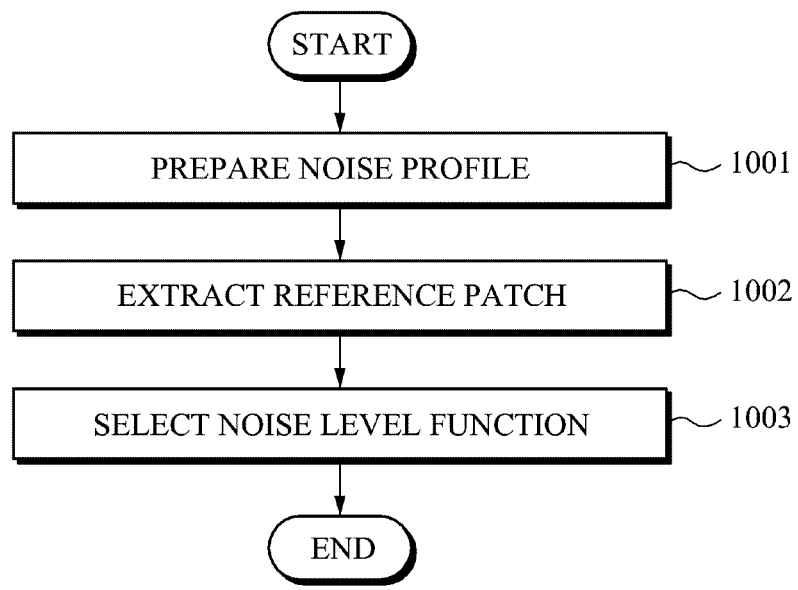
FIG. 10 is a flowchart illustrating an example of a method for estimating a noise level.

FIG. 10 is a flowchart that illustrates a method for calculating a noise level. Referring to FIG. 10, in 1001, a noise profile including a plurality of noise level functions having a luminance level as an independent variable is prepared. An example of a noise profile has been described in FIG. 7.

In 1002, an image is divided into a plurality of patches, sequentially, and a reference patch is extracted from the patches. The reference patch is a patch, which corresponds to a luminance level area of the noise level function exhibiting the largest variation and has a smallest standard deviation.

In 1003, one of the noise level functions is selected by comparing a noise statistic of the reference patch with the noise profile.

As described above, a signal level is estimated by applying a kernel size suitable for the respective sub-bands and a noise level is estimated using a noise level function, so that the signal level and the noise level, which are used when performing wavelet transformation, are more precisely calculated and the noise can be effectively reduced.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for reducing noise in an image, the apparatus comprising:
 a transformation unit to divide the image into a plurality of sub-bands through wavelet transformation;
 a signal level estimation unit to estimate the signal level of the image using a kernel of which a size varies according to a resolution level and binary data of each sub-band;
 a noise level estimation unit to estimate a noise level of the image using a predetermined noise profile; and
 a noise reducing unit to reduce noise in the image using the estimated signal level and the estimated noise level.

2. The apparatus of claim 1, wherein the signal level estimation unit comprises:
 a kernel set storage unit to store a kernel set in which the size of the kernel is based on the resolution level and the binary data of each of the sub-bands;
 a kernel map generation unit to generate a kernel map by converting wavelet coefficients of the sub-band into binary data; and
 a signal level calculation unit to calculate the signal level while adjusting the size of the kernel based on the kernel map and the kernel set.

3. The apparatus of claim 2, wherein, the resolution level ranges from a first resolution level representing a highest resolution to an $n^{th}$ resolution level representing a lowest resolution, and
 the kernel map generation unit selects at least one sub-band having one of the $n^{th}$ resolution level, an $n-1^{th}$ resolution level, or an $n-2^{th}$ resolution level, and generates the kernel map corresponding to the selected sub-band.

4. The apparatus of claim 3, wherein the kernel map is generated by normalizing the wavelet coefficients of the selected sub-band, converting the normalized wavelet coefficients into binary data, and performing morphological dilatation on the converted binary data.

5. The apparatus of claim 1, wherein the noise level estimation unit comprises:
 a profile storage unit to store the noise profile that includes a plurality of functions which represent noise corresponding to luminance;
 a patch extraction unit to divide the image into a plurality of patches and extract a reference patch from the plurality of patches; and
 a noise level calculation unit to select a function by comparing a noise statistic of the extracted reference patch with the noise profile.

6. The apparatus of claim 5, wherein the patch extraction unit extracts patches corresponding to a predetermined luminance level area based on the noise profile and determines, as the reference patch, a patch from among the extracted patches using standard deviations of the extracted patches.

7. The apparatus of claim 6, wherein the predetermined luminance level area corresponds to an area of the function that exhibits a largest noise variation.

8. The apparatus of claim 1, wherein the noise reducing unit reduces the noise through wavelet shrinkage based on the estimated signal level and the estimated noise level.

9. The apparatus of claim 1, further comprising an inverse transformation unit to receive a processing result by the noise reducing unit and recover the image through inverse wavelet transformation.

10. A method of reducing noise in an image, the method comprising:
 dividing the image into a plurality of sub-bands through wavelet transformation;
 estimating a signal level of the image using a kernel of which a size varies according to a resolution level and binary data of each sub-band;
 estimating a noise level of the image using a noise profile; and
 reducing noise in the image using the estimated signal level and the estimated noise level.

11. The method of claim 10, wherein the estimating of the signal level comprises:
 storing a kernel set in which the size of the kernel is defined according to the resolution level and binary data of each sub-band;
 generating a kernel map by converting wavelet coefficients of each sub-band into binary data; and
 calculating the signal level while adjusting the size of the kernel based on the kernel map and the kernel set.

12. The method of claim 11, wherein, the resolution level ranges from a first resolution level representing a highest resolution to an $n^{th}$ resolution level representing a lowest resolution, and
 the generating of the kernel map comprises selecting at least one sub-band having one of the $n^{th}$ resolution level, an $n-1^{th}$ resolution level, or an $n-2^{th}$ resolution level, and generating the kernel map corresponding to the selected sub-band.

13. The method of claim 12, wherein the kernel map is generated by normalizing the wavelet coefficients of the sub-band, converting the normalized wavelet coefficients into binary data, and performing morphological dilatation on the binary data.

14. The method of claim 10, wherein the estimating of the noise level comprises:
 dividing the image into a plurality of patches and extracting a reference patch from the plurality of patches; and
 selecting a function which represents noise corresponding to luminance by comparing a noise statistic of the extracted reference patch with the noise profile.

15. The method of claim 14, wherein the extracting of the reference patch comprises extracting patches corresponding to a predetermined luminance level area based on the noise profile and extracting, as the reference patch, a patch from among the extracted patches using standard deviations of the extracted patches.

16. The method of claim 15, wherein the predetermined luminance level area corresponds to an area of the function that exhibits a largest noise variation.

17. The method of claim 10, wherein the reducing of the noise is performed through wavelet shrinkage based on the estimated signal level and the estimated noise level.

18. The method of claim 10, further comprising recovering the image through inverse wavelet transformation.

* * * * *